(No Model.)
J. S. SMITH.
LEVELING INSTRUMENT.
No. 367,859.  Patented Aug. 9, 1887.
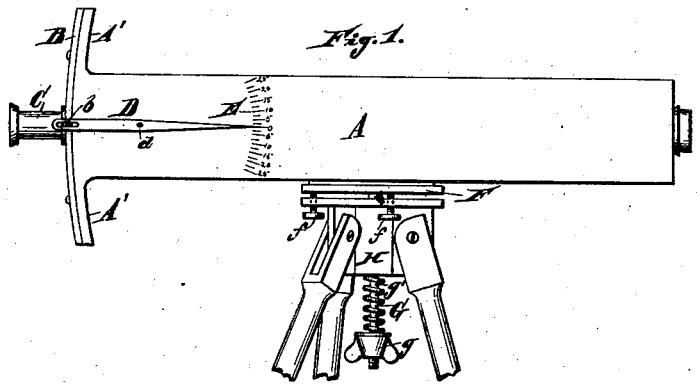
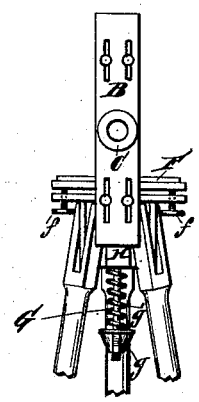
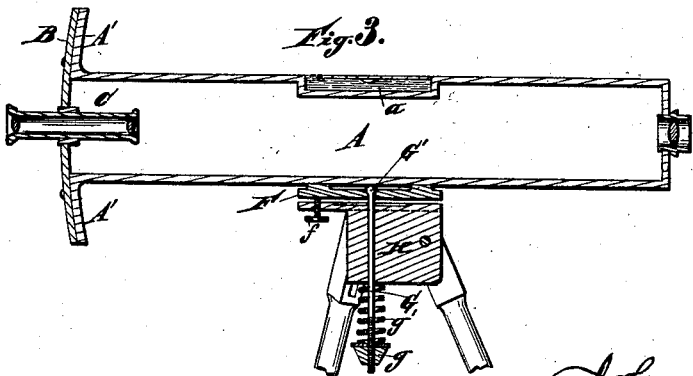
WITNESSES
Chs H. Jarvis
P. L. Dorland
John S. Smith
INVENTOR
by
R. Mason
Attorney

UNITED STATES PATENT OFFICE.

JOHN S. SMITH, OF JACKSON, MICHIGAN.

LEVELING-INSTRUMENT.

SPECIFICATION forming part of Letters Patent No. 367,859, dated August 9, 1887.

Application filed November 13, 1886. Serial No. 218,757. (No model.)

*To all whom it may concern:*

Be it known that I, JOHN S. SMITH, of Jackson, in the county of Jackson and State of Michigan, have invented a new and useful Improvement in Instruments for Leveling, of which the following is a specification.

The object of my invention is the production of a simple, cheap, and reliable instrument especially designed for use in laying drain-tile. To this end it consists in the attachment to a telescopic tube of a vertically-adjustable eye-glass and index for establishing the intermediate stakes between the terminals of the drain.

In the annexed drawings, making part of this specification, Figure 1 is a side elevation. Fig. 2 is an end elevation, and Fig. 3 is a longitudinal vertical section.

The same letters are employed in all the figures in the indication of identical parts.

A is the body of the telescope, in the top of which is placed a longitudinal spirit-level, $a$, intended to fix the telescope horizontally. The end of the tube is flanged at A' to permit the attachment of an adjustable concave plate, B, which carries the eyeglass C. This plate is slotted and attached to the flanges A' by set-screws, as shown in Fig. 2, or in other convenient and known manner.

In the middle of the plate is inserted a tube, C, containing the usual and necessary lenses, and also the spider-webs, commonly employed in such instruments. The convex surface of the flanges A' and the concave surface of the plate B are curved in the arc of a circle having its center in the object-glass at the other end of the instrument, and thereby the eyeglass C will always be radial to such a circle and therefore point to the object-glass of the telescope in all positions of the adjustable plate B.

An index-finger, D, is attached to plate B by a pin in a slot, $b$, and to the tube A by a pin, $d$, so that when the plate B is shifted the point of the index will traverse the face of a graduated plate, E, the marks on which should be graduated to indicate elevations or depressions in inches or fractions thereof to rods of distance.

The telescope is attached to the head of the tripod by a swivel-joint allowing the adjustment of the telescope vertically and also permitting it to turn in a horizontal plane. A plate, F, is secured to the under side of the tube A, and this rests upon the points of adjusting-screws $ff$, passing through the plate on the end of the tripod-head H. A rod, G, passes vertically through the tripod-head H, and terminates with a spherical head, G'. This rod is surrounded by a spiral spring, $g'$, the tension of which is determined by the nut $g$. This adjusting device permits the telescope to be adjusted horizontally, turning on the head G', as shifted by the set-screws $f\,f$, and also to swing horizontally in the plane of the points of the set-screws, turning on the head G' as a pivot.

The instrument is operated as follows: The pointer being at zero and the telescope duly adjusted, levels may be taken in the usual manner to ascertain the entire fall. Then, by shifting the eyeglass to the proper angle, the intermediate stakes may be set so as to give the proper slope to the drain by merely looking through the telescope.

What I claim as my invention, and desire to secure by Letters Patent, is—

1. In combination with the tube and object-glass of a telescope and means for leveling the tube, an eyeglass, C, vertically and independently adjustable in the arc of a circle, substantially as set forth.

2. The combination of the telescopic tube A, constructed with a flange, A', in the arc of a circle, and an eyeglass, C, held in the curved plate B in a position radial to the circle which defines the surfaces of the flange and plate, substantially as set forth.

3. The combination of the tube A, having flanges A', the plate B, adjustably attached thereto and carrying the eyeglass C, the index-finger D, and the scale E, substantially as set forth.

In testimony of which I have hereunto set my hand in the presence of two attesting witnesses.

JOHN S. SMITH.

In presence of—
WM. M. EATON,
ELI A. CLEMENT.